United States Patent
Shatzkamer et al.

(10) Patent No.: US 9,979,704 B2
(45) Date of Patent: May 22, 2018

(54) END-TO-END SECURITY FOR VIRTUAL PRIVATE SERVICE CHAINS

(71) Applicant: Cisco Technology, Inc., San Jose, CA (US)

(72) Inventors: Kevin D. Shatzkamer, Hingham, MA (US); Hendrikus G. P. Bosch, Aalsmeer (NL); Warren Scott Wainner, Sterling, VA (US); James N. Guichard, New Boston, NH (US); Surendra M. Kumar, San Ramon, CA (US)

(73) Assignee: Cisco Technology, Inc., San Jose, CA (US)

(*) Notice: Subject to any disclaimer, the term of this patent is extended or adjusted under 35 U.S.C. 154(b) by 655 days.

(21) Appl. No.: 14/573,564

(22) Filed: Dec. 17, 2014

(65) Prior Publication Data
US 2016/0182458 A1 Jun. 23, 2016

(51) Int. Cl.
*H04L 29/06* (2006.01)
*G06F 9/455* (2018.01)
*G06F 21/60* (2013.01)

(52) U.S. Cl.
CPC ...... *H04L 63/0428* (2013.01); *G06F 9/45558* (2013.01); *G06F 21/606* (2013.01); *G06F 2009/45587* (2013.01); *G06F 2009/45595* (2013.01)

(58) Field of Classification Search
CPC .............. H04L 63/0428; G06F 9/45558; G06F 2009/45595; G06F 2009/45587
See application file for complete search history.

(56) References Cited

U.S. PATENT DOCUMENTS

| 8,429,400 | B2 | 4/2013 | Khalid et al. | |
| 2008/0320303 | A1* | 12/2008 | Khalid | H04L 9/0833 713/163 |
| 2011/0302415 | A1* | 12/2011 | Ahmad | G06F 21/57 713/168 |
| 2012/0204030 | A1* | 8/2012 | Nossik | H04L 9/0822 713/168 |
| 2013/0007239 | A1* | 1/2013 | Agarwal | H04L 63/02 709/223 |
| 2014/0115325 | A1* | 4/2014 | Detienne | H04L 63/0209 713/160 |

(Continued)

OTHER PUBLICATIONS

Weis et al., "The Group Domain of Interpretation", Internet Engineering Task Force (IETF), Standards Track, Oct. 2011, 64 pages.

*Primary Examiner* — Joseph P Hirl
*Assistant Examiner* — Thomas Gyorfi
(74) *Attorney, Agent, or Firm* — Edell, Shapiro & Finnan, LLC

(57) ABSTRACT

A first virtual machine is established in a virtual private service chain to provide a first network service to virtual private service chain traffic. A second virtual machine is also established the virtual private service chain to provide a second network service to the virtual private service chain traffic. The virtual private service chain traffic is encrypted for transmission within the virtual private service chain from the first virtual machine to the second virtual machine, wherein the encryption uses a key shared by the first and second virtual machines.

24 Claims, 11 Drawing Sheets

(56) References Cited

U.S. PATENT DOCUMENTS

| | | | | |
|---|---|---|---|---|
| 2014/0149490 A1* | 5/2014 | Luxenberg | ............... | G06F 15/00 709/203 |
| 2014/0310810 A1* | 10/2014 | Brueckner | ........... | H04L 63/1441 726/23 |
| 2015/0370586 A1* | 12/2015 | Cooper | ................ | G06F 9/45533 710/308 |
| 2016/0085577 A1* | 3/2016 | Gray | .................... | G06F 9/45558 718/1 |
| 2016/0350535 A1* | 12/2016 | Garcia | ................... | G06F 21/572 |

* cited by examiner

END-TO-END SECURITY FOR VIRTUAL PRIVATE SERVICE CHAINS

TECHNICAL FIELD

The present disclosure relates to virtual private service chains, and in particular, security within virtual private service chains.

BACKGROUND

A virtual private service chain relates to a networking technique for implementing a nested service chaining solution, which is based on leveraging an intelligent classifier within a public service chain that maps traffic into a private service chain. This private service chain consists of a private classification engine with defined rules enabled by a third party, and dedicated virtual instances of network service functions expressed in a service catalog, that are chained based on private classifications.

Service functions in the service chain are instantiated by a service provider, such as a mobile service provider, and include functions such as deep-packet inspection (DPI), firewall services, network address translation (NAT), and hypertext transfer protocol (HTTP) application functions, among other functions that are assigned to a customer. As traffic travels through these services functions, the service functions augment or operate on the traffic.

DESCRIPTION OF EXAMPLE EMBODIMENTS

Overview

According to a first example embodiment, a first virtual machine is established in a virtual private service chain to provide a first network service to virtual private service chain traffic. A second virtual machine is also established in the virtual private service chain to provide a second network service to the virtual private service chain traffic. The virtual private service chain traffic is encrypted for transmission within the virtual private service chain from the first virtual machine to the second virtual machine, wherein the encryption uses an encryption key shared by the first and second virtual machines.

According to a second example embodiment, an encryption key is retrieved from a shared key server, wherein the retrieval of the encryption key is performed by a first virtual machine within a virtual private service chain. Traffic is received at the first virtual machine from a second virtual machine within the virtual private service chain, wherein the traffic has been encrypted with the encryption key. The traffic is decrypted using the encryption key. Network services are applied to the decrypted traffic. The traffic is re-encrypted using the encryption key. The re-encrypted traffic is transmitted through the virtual private service chain.

As used herein, the terms "first," "second" and the like, do not denote any order or importance, but rather are used to distinguish one element from another.

Example Embodiments

Figure 1:
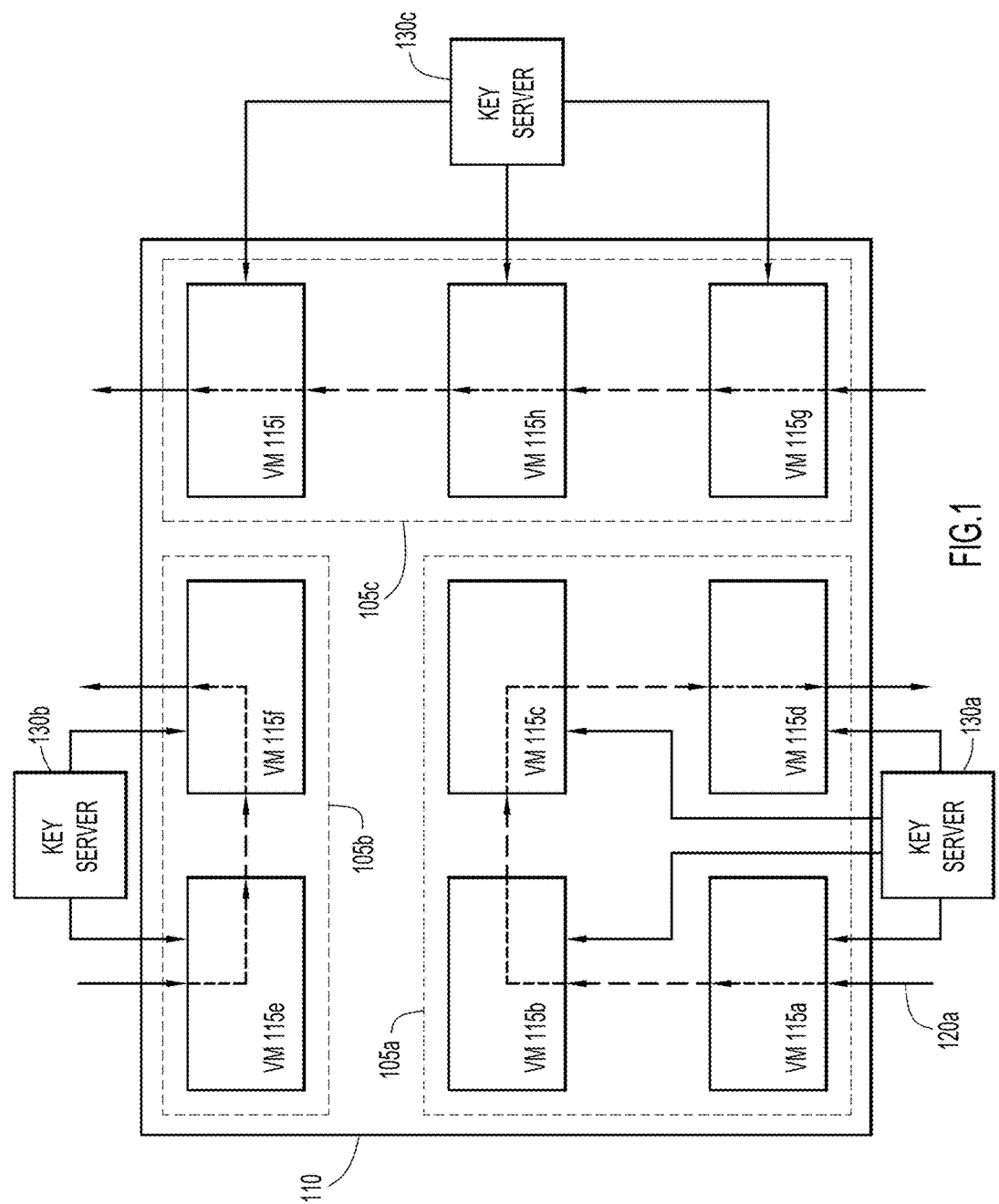
FIG. 1 is an illustration of a service provider environment containing multiple virtual private service chains, each of which is configured to provide end-to-end security, according to an example embodiment.

Depicted in FIG. 1 is a simplified view of a plurality of virtual private service chains (VPSCs) 105a, 105b and 105c, all of which are residing in the same service provider environment 110. Each of the VPSCs 105a-c implements an end-to-end security relationship, which prevents traffic from each of the VPSCs 105a-c from "leaking" into or being accessed by another of VPSCs 105a-c or other devices and/or users within service provider environment 110. This end-to-end security is beneficial because a tenant may want to hide its content from the service provider that establishes the VPSC environment 110 (e.g., for legal or business reasons) while the service functions must operate on cleartext traffic. The tenant may also seek to maintain the end-to-end security relationship between its subscriber and its services. Yet, at the same time the tenant may need mechanisms to send unencrypted content freely between service functions hosted on and operating on behalf of the tenant in the service provider's infrastructure.

In order to provide this end-to-end security, each of virtual machines 115a-g will apply encryption specific to its VPSC. Using VPSC 105a as an example, traffic 120a enters service provider environment 110, and VPSC 105a in particular, at a public address associated with virtual machine 115a.

Virtual machine 115a applies its particular service to unencrypted traffic 120a, as illustrated by the short-dashed portion of traffic 120. The service provided by virtual machine 115a may take the form of deep-packet inspection (DPI), firewall services, network address translation (NAT), hypertext transfer protocol (HTTP) application functions, and other functions/services. Traffic 120a will then be sent to virtual machine 115b for application of another service/ function. In order to ensure that traffic 120a is secure when in VPSC 105a, virtual machine 115a will encrypt traffic 120a for transmission to virtual machine 115b. When traffic 120a is encrypted, it is illustrated through long-dashed portions of traffic 120a. Once traffic 120a is received at virtual machine 115b, it is decrypted by virtual machine 115b, and the service provided by virtual machine 115b is applied to traffic 120a. A similar encryption, decryption, and application of services takes place between virtual machine 115b and virtual machine 115c, and between virtual machine 115c and virtual machine 115d. Finally, once traffic 120a reaches the end of VPSC 105a, virtual machine 115d will strip the specific encryption off of traffic 120a so that traffic 120a may transfer to network addresses located outside of VPSC 105a. For completeness, it is noted that the traffic 120a may be encrypted prior to entry into environment 110, yet the keys used to encrypt and decrypt the traffic within VPSC 105a will be different from those used to encrypt the traffic prior to entry into VPSC 105a. Similar encryption and decryption may also take place for traffic 120b and 120c in VPSCs 105b and 105c, respectively.

Absent the encryption and decryption provided at each of virtual machines 115a-d, other network devices and functional units within service provider environment 110 may, inadvertently or maliciously, access traffic within VPSC 105a. This is because the service provider which establishes environment 110 may inspect and analyze traffic within the environment which is common to all of its tenant virtual machines, even when the tenants (i.e., content providers) whose traffic is serviced by the virtual machines belong to different tenants. Furthermore, even if the service provider were to provide security specific to each of VPSCs 105a-c, the service provider would still be able to access the traffic within the tenant VPSCs 105a-c, as the service provider would maintain control over the applied security.

In order to allow for tenant-specific control of the encryption provided by virtual machines 115a-g, the tenants for each of VPSCs 105a-c will employ a form of group security, achieved through group key servers 130a-c. Each tenant associated with each of VPSCs 105a-c will maintain a key server 130a-c, respectively. Each of the virtual machines within VPSCs 105a-c will access its respective key server 130a-c to acquire the keys necessary to allow virtual machines within the same VPSC to encrypt and decrypt their respective traffic. Furthermore, because key servers 130a-c are maintained by the tenants for each of VPSCs 105a-c, the encryption for VPSCs 105a-c may be provided separately from the service provider that establishes environment 110. Accordingly, the traffic serviced by each of VPSCs 105a-c will be secure from the other VPSCs, and secure from the service provider.

According to one example embodiment, the VPSC-specific security may be provided through the use of Group Domain of Interpretation (GDOI). GDOI may be used as a mechanism to convey group security keys to enterprise sites that require secure communications between multiple remote enterprise branch locations using a common group key that is managed by a Group Control Key Server (GCKS) through the GDOI protocol. When using GDOI, key servers 130a-c may be embodied as GCKSs. The shared security association ensures all communications between network service functions (e.g., virtual machines 105a-g for respective VPSCs 105a-c) are secured and there is no data leakage (i.e., "in the clear" communications) between individual service functions (e.g., virtual machines 105a-g) within a VPSC over either physical or virtual links. When used to provide end-to-end security in VPSCs, GCKSs operate within and under the authority of the tenant's infrastructure and can provide group keys (e.g., Key Encryption Key, Traffic Encryption Key) to establish a shared security association (SA) for all of the service functions (e.g., virtual machines) or their network proxies hosted within the service provider environment 110 for one of VPSCs 105a-c. Phase 1 authentication (e.g., the generation of a shared key) can be performed, for example, by using the Internet Security Association and Key management Protocol (ISAKMP), Internet Key Exchange (IKE, IKE version 2 (IKEv2)), or Kerberized Internet Negotiation of Keys (KINK).

In order to ensure that service functions or virtual machines 115a-g within VPSCs 105a-c are aware of the need for secure communications, template-based configurations may be applied to virtual machines 115a-g. These template-based configurations may be implemented through the use of the European Telecommunications Standards Institute (ETSI) Network Functional Virtualization (NFV) Virtual Network Functional Descriptors (VNFDs). While VNFDs create service graphs (i.e., chains), associated applications and physical links, they do not necessarily provide a mechanism to ensure end-to-end privacy and security of the service graph. Accordingly, the techniques described herein may be added to VNFDs for use when configuring virtual machines.

Figure 2:
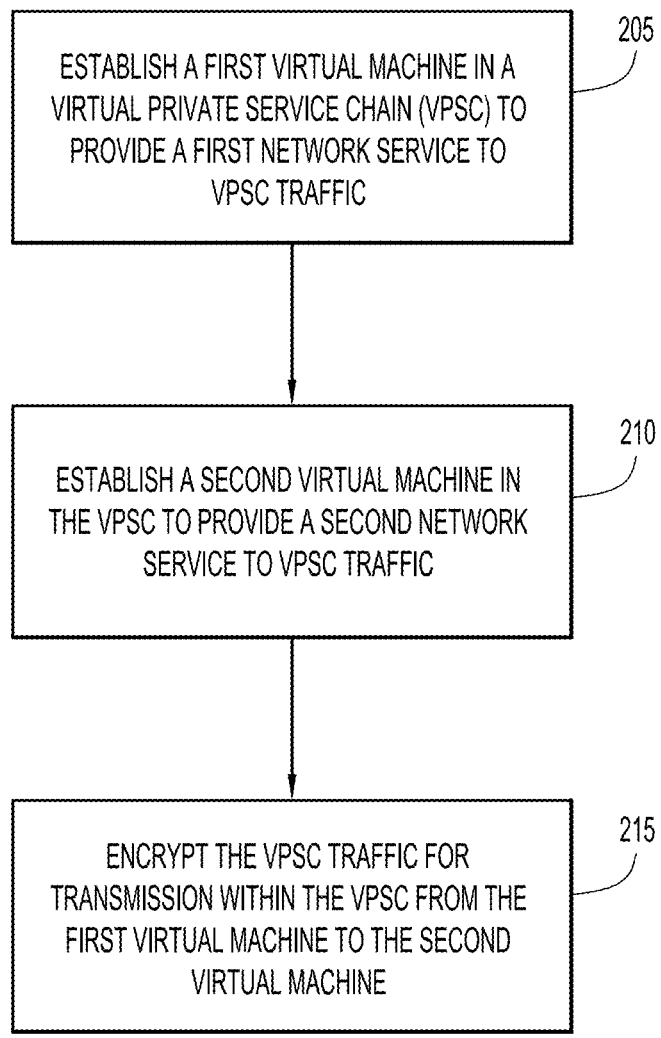
FIG. 2 is a flowchart illustrating a first process for providing end-to-end security in a virtual private service chain, according to an example embodiment.

With reference now made to FIG. 2, depicted therein is a flowchart 200, illustrating a process for providing end-to-end security within VPSCs. The process begins in 205 where a first virtual machine in a VPSC is established in order to provide a first network service to VPSC traffic. The first virtual machine may be established by a tenant, within an environment provided by a service provider. According to example embodiments, a VNFD configured to define end-to-end security may be used to establish the first virtual machine. Furthermore, the establishment of the first virtual machine may include associating a service chain context with the first virtual machine that binds to the tenant's key server and obtains that tenant's shared keys applicable to the VPSC.

In 210, a second virtual machine is established within the VPSC to provide a second network service to VPSC traffic. As with the first virtual machine, the second virtual machine may be established by a tenant within a VPSC environment provided by a service provider. Furthermore, the second virtual machine may be established through the use of a VNFD configured to define end-to-end security for the second virtual machine within the VPSC. As with the establishment of the first virtual machine, the establishment of the second virtual machine may include associating a service chain context with the second virtual machine that binds to the tenant's key server and obtains that tenant's shared keys applicable to the VPSC. Furthermore, the establishment of the first virtual machine and the second virtual machine may include linking the context of first virtual machine to the context of second virtual machine such that a secured path is established between the two virtual machines.

In 215, the traffic within the VPSC is encrypted for transmission between the first virtual machine and the second virtual machine. As will be described in greater detail with reference to FIGS. 4-9 below, this encryption may take place at an internal interface of the first virtual machine. Furthermore, the encryption may take place through the use of a shared key which is controlled by the tenant responsible for the network service provided by the first and second virtual machines. This shared key may be one of the shared keys received from the tenant key server by the first virtual machine and/or the second virtual machine.

In other words, FIG. 2 illustrates a process that allows for the secure transmission of traffic in a VPSC. Specifically, the first virtual machine receives traffic that is classified to enter a virtual private service chain. The first virtual machine executes the service function and directs the packet into the VPSC. According to one example, the first virtual machine retrieves a shared key from a shared key server, encrypts the traffic, and forwards the traffic to a second virtual machine. The process of FIG. 2 may continue, and include the second virtual machine decrypting the traffic using the shared key. Network services are then applied by the second virtual machine on the decrypted traffic previously sent as encrypted traffic by the first virtual machine. The decrypted traffic to which the second virtual machine has applied its services is re-encrypted by the second virtual machine. This re-encrypted traffic is then transmitted through the remainder of the VPSC by the second virtual machine.

Figure 3:
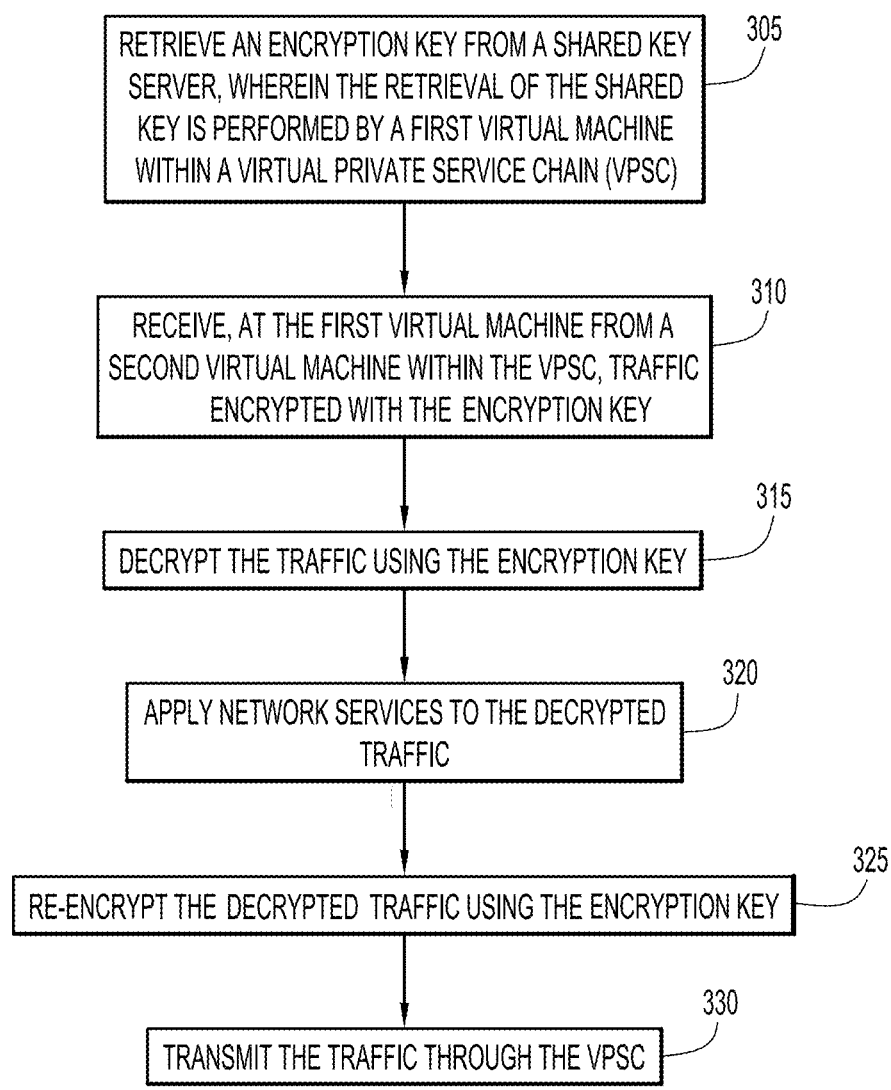
FIG. 3 is a flowchart illustrating a second process for providing end-to-end security in a virtual private service chain, according to an example embodiment.

With reference now made to FIG. 3, depicted therein is a flowchart 300, depicting a process carried out by a virtual machine within in a VPSC in which end-to-end security has been enabled. For example, the process illustrated in FIG. 3 is directed to the process steps performed by an intermediate VPSC virtual machine, such as virtual machine 115b of FIG. 1. The process begins in 305 where a first virtual machine retrieves an encryption key (e.g., a shared key) from a shared key server. The key server may be a GCKS as described above with reference to FIG. 1.

In 310, traffic is received at the first virtual machine from a second virtual machine also located within the VPSC. The received traffic is encrypted by the same encryption key that was retrieved from the shared key server by the first virtual machine. In 315, the first virtual machine decrypts the traffic using the encryption key. Network services performed by the first virtual machine are then applied to the decrypted traffic by the first virtual machine in 320. In 325, the decrypted traffic is re-encrypted by the first virtual machine. This re-encrypted traffic is then transmitted through the VPSC by the first virtual machine in 330.

Figure 4:
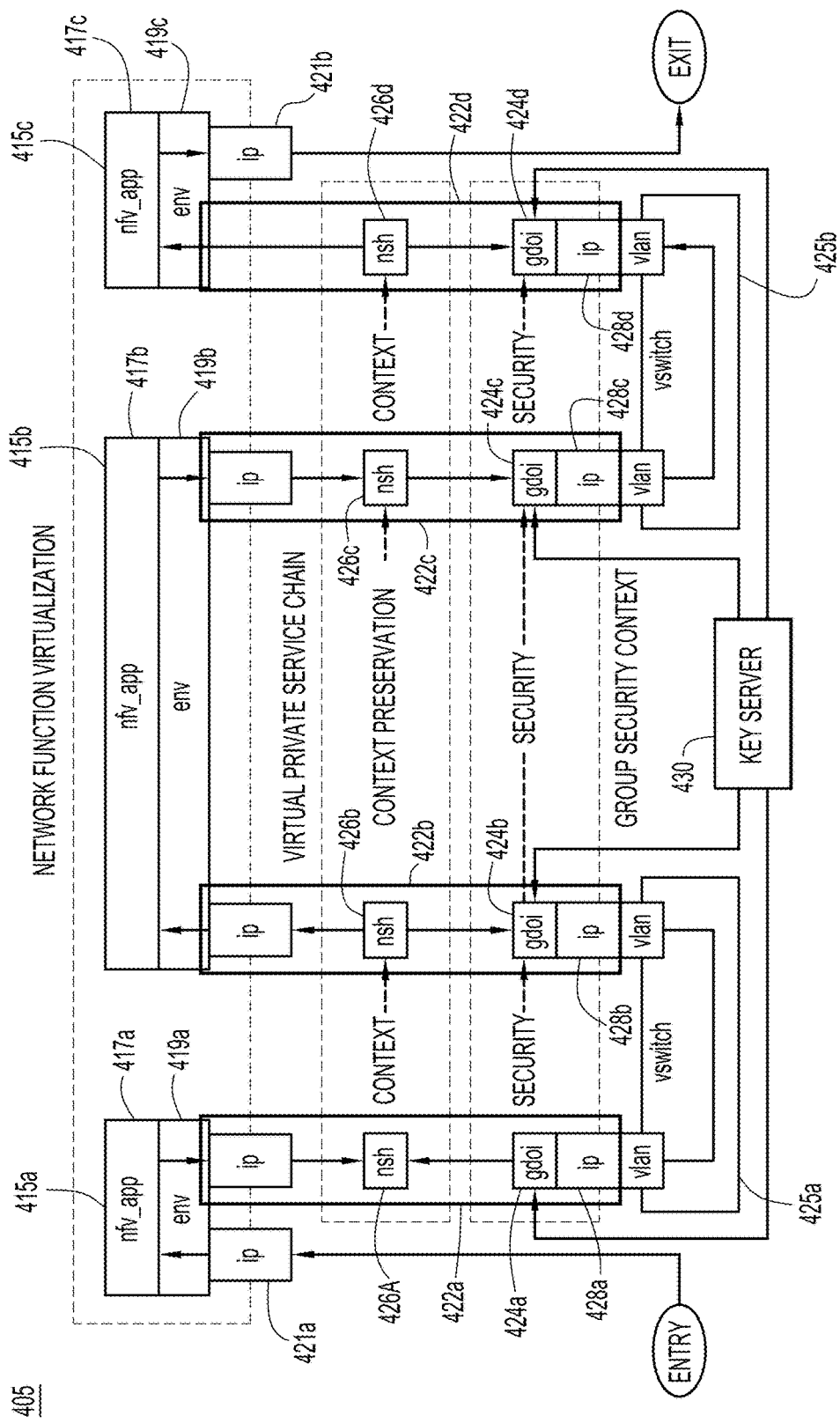
FIG. 4 is an illustration of a virtual private service chain configured to provide end-to-end security, according to an example embodiment.

With reference now made to FIG. 4, depicted therein is a VPSC 405 which implements end-to-end security. Specifically, virtual machines 415a-c are configured to provide network services to traffic within VPSC 405 while ensuring that traffic remains secure as it travels between virtual machines 415a-c. As illustrated in FIG. 4, each virtual machine 415a-c includes a network service 417a-c, which in the present example includes load balancer 417a, firewall 417b, and intrusion detector 417c. Each network service 417a-c resides within an environment 419a-c, respectively. As will be described in greater detail with reference to FIGS. 5-9, below, environments 419a-c may be one or more combinations of hypervisors, virtual packet forwarding processes, virtual switches and/or proxy environments, among others.

When traffic (i.e., packets) enters or exits VPSC 405 it will utilize external interfaces 421a and 421b. External interfaces 421a and 421b may be used for connections downstream and upstream of VPSC 405. For example, external interface 421a may be used for connections upstream from VPSC 405 (i.e., towards the servers), while the external interface 421b may be used for connections downstream of the service chain (i.e., towards the client). Internal interfaces, such as virtual network interface cards (NICs) 422a-d serve to transfer traffic through VPSC 405. The internal interfaces 422a-d are used for communications between service functions 417a-c in VPSC 405. It is within virtual NICs 422a-d that the end-to-end security is applied.

Within each of virtual NICs 422a-d is a GDOI interface 424a-d, respectively, which acquires shared keys to be used to encrypt and decrypt the traffic sent within VPSC 405. The shared keys are used to encrypt traffic as it leaves each virtual machine 415a-c for transmission to the next virtual machine through virtual switches 425a and 425b, and decrypt traffic as it enters the virtual machines 415a-c.

As illustrated in FIG. 4, each virtual machine 415a-c connects to key server 430 through GDOI interfaces 424a-d to acquire the keys for applying the GDOI security. Because group security, such as GDOI is utilized, the security can be applied to the traffic regardless of the order by which the traffic traverses virtual machines 415a-c. For example, the tunnel through which the traffic traverses VPSC 405 may be determined by a network service header (NSH) applied to the VPSC traffic. The NSH encapsulates the original tenant IP packet and the NSH is subsequently encapsulated in a new IP packet that provides the routing of the packet between virtual network functions. While a shared IP address space may be used for multiple tenants, the use of GDOI group keys for all packets within that space would provide "service provider security," but would not provide security for the tenants. The insertion of a NSH means that a new IP header is imposed and the range of allocated IP's may be "bound" to the tenant. The tenant can manage the security policy associated with the group keys to enforce protection of traffic between virtual network services within the range of IP addresses allocated to the tenant.

When the VPSC is established, the NSH/IP encapsulation correlates with the scope of policy enforced by the tenant. This means the service provider's establishment of the VPSC conforms to the tenant's authorized scope of protection. As such, the NSH/IP encapsulation may not be random, but may instead be prescriptive according to the tenant's policy. If a VPSC is established that forwards traffic beyond the authorized scope provided by the tenant, the traffic will be protected and unintelligible to a third party due to the encryption provided by the tenant group key. Likewise, a third party that injects flows into the VPSC will have those flows discarded because they are not properly secured. In other words, the tenant defines the scope of security (IP address ranges). The service provider builds VPSCs using NSH/IP addresses that conform to the tenant's allocated IP address range. When a tenant's virtual network function is established on a platform, the service provider must incorporate the function into the tenant's service chain(s). In doing so, the service provider associates the NSH/IP encapsulation process to the virtual network function in accordance to the tenant's policy.

NSH functional units 426a-d serve as assemblers to attach network service headers to traffic as the traffic leaves virtual machines 415a-c, and serve as parsers to parse the network service headers of packets in order to determine the context of traffic from network service headers as the traffic is received at virtual machines 415a-c. Because GDOI is a group security system, in which all members of the group utilize the same shared key received from group server 430, security can be consistently applied throughout VPSC 405 regardless of the order defined by the network service header. Accordingly, traffic can be rerouted through VPSC 405 without requiring individual virtual machines to redistribute keys. In fact, the flow context may change at anytime while the traffic is processed through VPSC 405 and the security association remains relevant regardless of this change. This is in contrast with other forms of Internet Protocol security (IPSec) in which the security is specific to the individual pairs of devices between which the traffic is being sent.

Accordingly, within VPSC 405 each of network services 417a-c may be initialized in different subnets that require Internet Protocol (IP) routing for forwarding of packets along the service chain. The environments 419a-c (e.g., hypervisors) facilitate the insertion of a network service header on the internal interface (i.e., assigns a tunnel header) through NSH functional units 426a-d, and direct the traffic to the next network service in VPSC 405. Specifically, the packets are subsequently processed by IPsec cryptological functions 428a-d which are applied at the virtual NICs 422a-d using the shared keys acquired by GDOI interfaces 424a-d. The IPSec functions 428a-d execute group IP encryption (e.g., GDOI) and present the packet to the Open Systems Interconnection model (OSI) Layer 2 switching infrastructure. Thus, the tenant can insure that any flow defined by their virtual private service chain can remain secure and avoid data leakage within the service provider's network infrastructure. Upon receipt at the next service function, the packet is decrypted by the IPSec functions 428a-d and the network service header is evaluated for context at NSH functional units 426a-d. The process may be repeated for each service function in the chain until the packet exits the last service function in the chain. The last service function will use an external interface 421a or 421b to route the packet to the destination.

Figure 5:
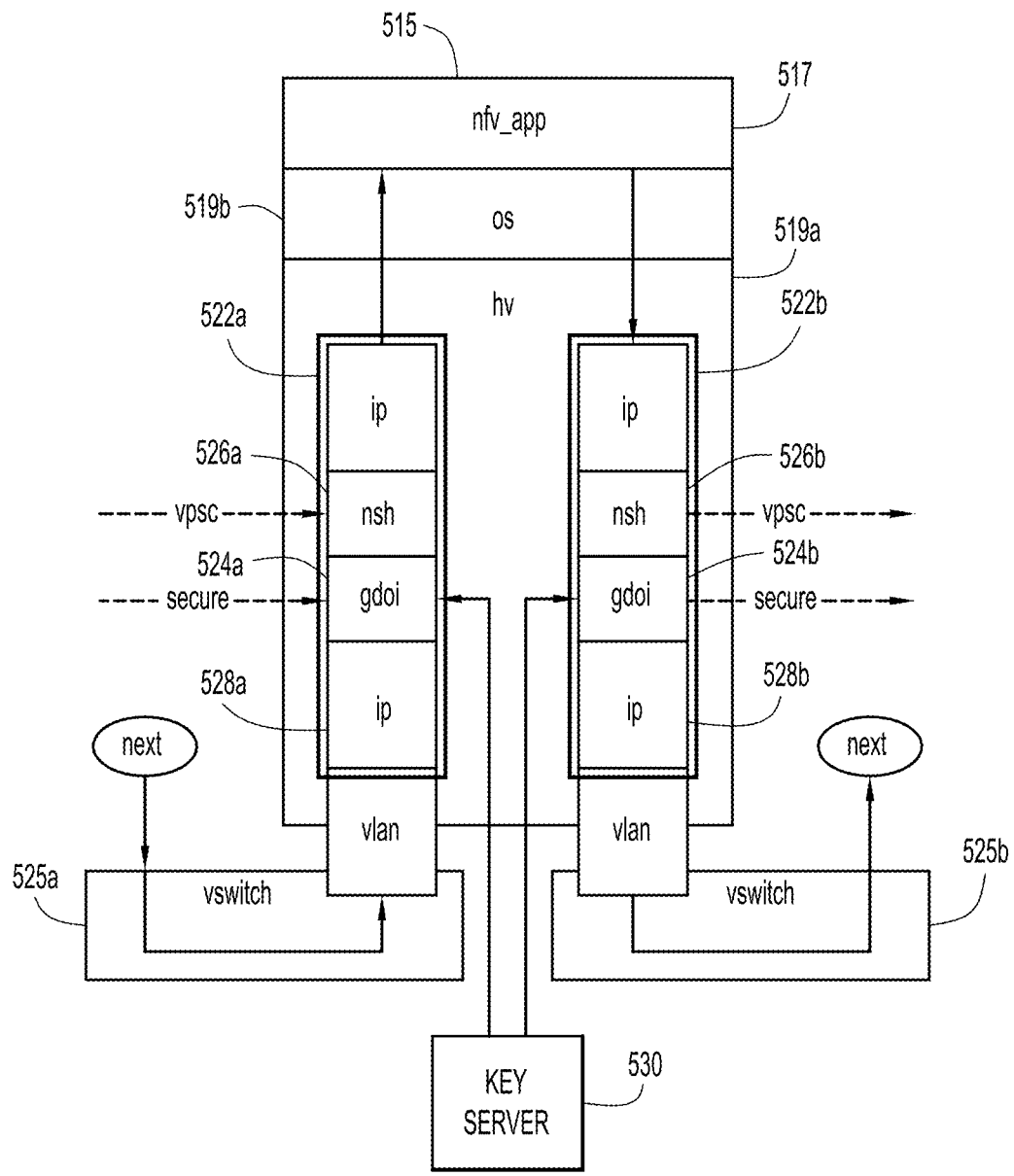
FIG. 5 is an illustration of a first virtual machine implemented within a hypervisor and utilizing a guest operating system in order to provide end-to-end security in a virtual private service chain, according to an example embodiment.

With reference now made to FIG. 5, depicted therein is one example embodiment in which virtual machine 515 applies network services 517 through a hypervisor 519a and a guest operating system (OS) 519b.

The network service 517 is instantiated on virtual machine 515 through the application of templates, such as ETSI templates. The templates may also define the ingress and egress interfaces 522a and 522b, respectively, which receive VPSC traffic for application of network services 517. As illustrated in FIG. 5, interfaces 522a and 522b are internal interfaces used for communications between service functions in a VPSC, though other virtual machines may include external interfaces, such as interfaces 421a and 421b described above with reference to FIG. 4. Network service 517 may be initialized in different subnets that require IP routing for forwarding of packets along the VPSC within which it resides. Upon receipt of a packet from a previous network service through virtual switch 525a, hypervisor 519a facilitates the IPSec 528a decryption of the packet using a group key received from GDOI 524a from key server 530. The network service header is examined for context by NSH functional unit 526a, and the unencrypted clear text packet has the network service 517 applied to it.

Subsequent to application of network service 517, hypervisor 519a facilitates the insertion of a network service header on the internal interface 522b by NSH functional unit 526a and directs the packet to the next network service in the VPSC. The packet is processed by the IPsec security function 528b, which executes group encryption utilizing the shared key received from key server 530 from GDOI 524b. IPsec 528b then presents the packet to the OSI Layer 2 switching infrastructure. Accordingly, VPSC internal interfaces are protected by a common key distributed through GDOI, and therefore, the sequence of functions in the VPSC is defined independently from the encryption and decryption. In fact, the flow through a VPSC may change at anytime while the packet is processed through the VPSC and the security association remains relevant even though the sequence of service functions is changed. Thus, the tenant can ensure that any flow defined by its virtual private service chain can remain secure and avoid data leakage within the service provider's network infrastructure.

Figure 6:
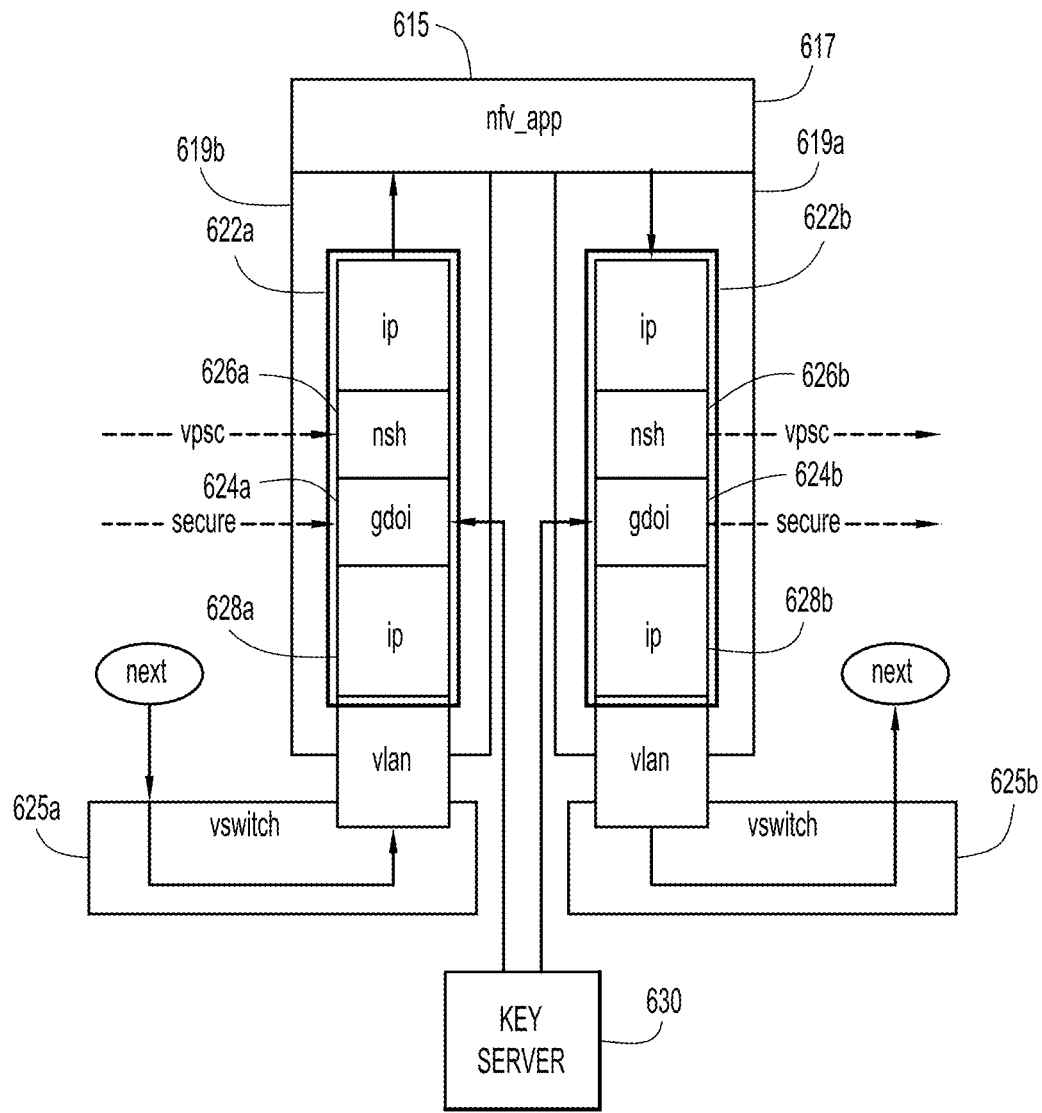
FIG. 6 is an illustration of a second virtual machine configured to utilize virtual packet processing to implement end-to-end security in a virtual private service chain, according to an example embodiment.

With reference now made to FIG. 6, depicted therein is a virtual machine 615 in which vector packet processing (VPP, packet forwarding entities) 619a and 619b replace the hypervisor 519a and guest OS 519b of FIG. 5. According to the example of FIG. 6, network service 617 understands the service chaining methodology. Accordingly, VPP sockets 619a and 619b are instantiated and bound to the service chain according to the policy requirement for a given flow. The network service 617 is bound to the ingress VPP 619a and egress VPP 619b where the appropriate templates are used to define the ingress interface 622a and egress interface 622b necessary for network service 617 to function. The VPP switching fabric of ingress VPP 619a and egress VPP 619b handle the ingress and egress forwarding of the VPSC traffic.

Upon receipt of a packet from a previous network service through virtual switch 625a, VPP 619a facilitates the IPSec 628a decryption of the packet using a group key received by GDOI 624a from key server 630. The network service header is examined for context by NSH functional unit 626a, and the network service 617 is applied to the unencrypted clear text packet.

Subsequent to application of network service 617, VPP 619b facilitates the insertion of a network service header on the internal interface 622b by NSH functional unit 626b, and directs the packet to the next network service in the VPSC. The packet is processed by the IPsec security function 628b, which executes group IP encryption utilizing the shared key received from key server 630 from GDOI 624b. IPsec 628b then presents the packet to the OSI Layer 2 switching infrastructure. Accordingly, VPSC internal interfaces are protected by a common key distributed through GDOI, and therefore, the sequence of functions in the VPSC is defined independently from the encryption and decryption. In fact, the flow through a VPSC may change at anytime while the packet is processed through the VPSC and the security association remains relevant regardless of the change to the sequence of service functions. Thus, the tenant can ensure that any flow defined by its virtual private service chain can remain secure and avoid data leakage within the service provider's network infrastructure.

Figure 7:
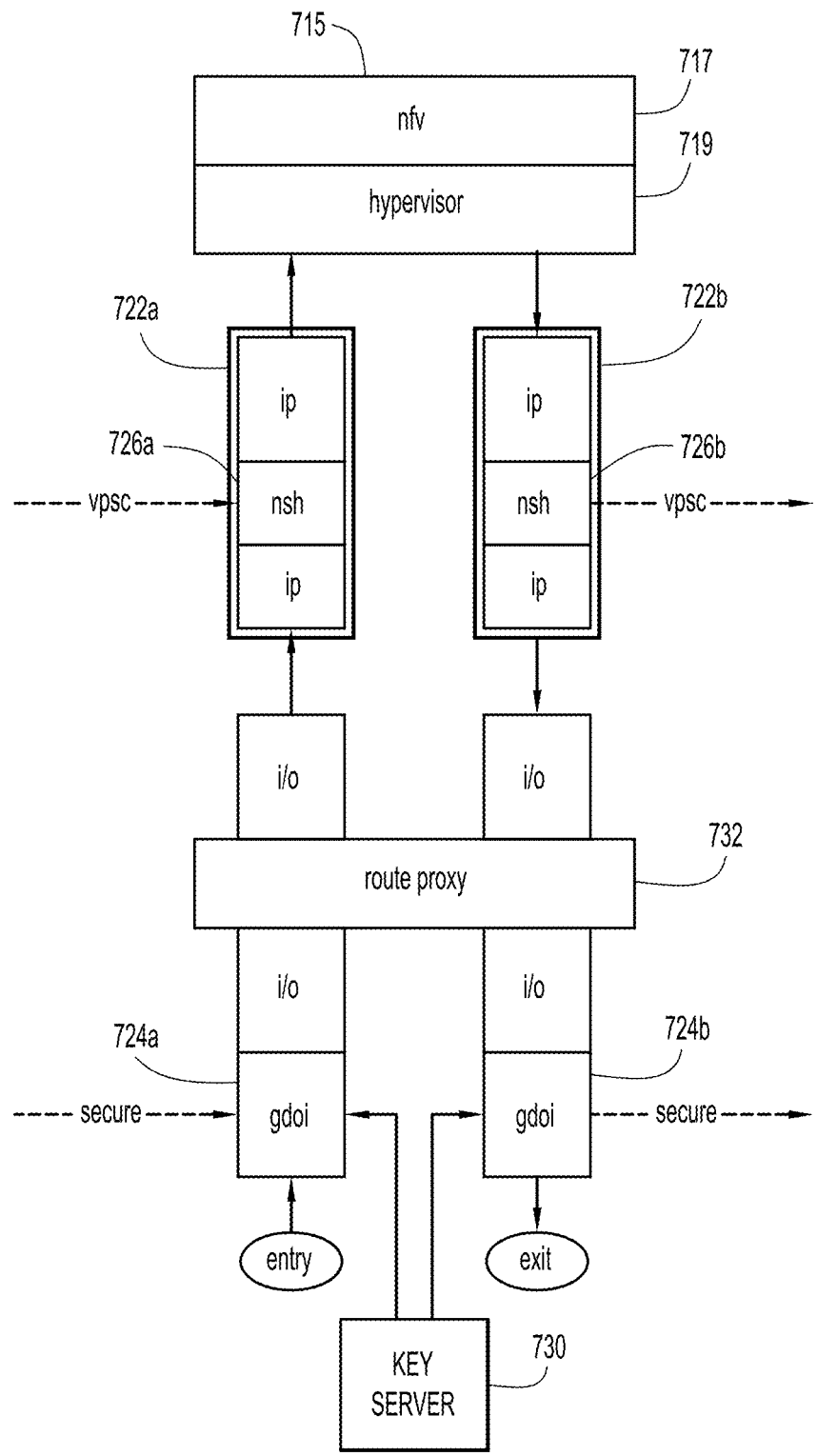
FIG. 7 is an illustration of a third virtual machine configured to utilize a virtual route proxy to implement end-to-end security in a virtual private service chain, according to an example embodiment.

With reference now made to FIG. 7, depicted therein is another example virtual machine 715 in which the network service 717 is instantiated on a virtual machine 715 where the appropriate templates are used to define the ingress and egress interfaces necessary for network service 715. Furthermore, unlike the examples of FIGS. 3-6, the encryption/decryption of VPSC traffic using the shared GDOI keys is not instantiated in hypervisor 719. Instead, route proxy 732 performs the encryption/decryption of the VPSC traffic. While this results in clear text traffic being sent from route proxy 732 to virtual machine 715, it nevertheless still provides security for transmission between route proxy 732 and other VPSC network services.

The operating system (not pictured) is virtualized in hypervisor 719 and may define two interfaces 722a and 722b. As illustrated in FIG. 7, interfaces 722a and 722b are internal interfaces used for communications between service functions in a VPSC, though other virtual machines may include external interfaces, such as external interfaces 421a and 421b described above with reference to FIG. 4.

VPSC traffic received at route proxy 732 is decrypted using shared keys received from key server 730 by GDOI 724a. The unencrypted or clear text traffic is then sent from route proxy 732 to virtual machine 715, where it is received at internal interface 722a. NSH functional unit 726a examines the network service header of the received traffic for context, and the network service 717 is applied to the traffic. The traffic is then forwarded on for application of another network service over internal interface 722b.

Through NSH functional unit 726b, hypervisor 719 facilitates the insertion of a network service header on the internal interface 722b (i.e., assigns a tunnel header) and directs the packet to the next service function in the VPSC. The hypervisor is incapable of executing the encryption function; therefore, the internal interface 722b is bound to routing proxy 732 where group encryption can be applied. The IP packet with the network service header appended thereto is routed and encrypted with IPsec encryption by route proxy 732 using the shared key received from GDOI 724b, and the packet is forward to the next service function. As with the other examples described above, the common key is distributed through GDOI via group server 730; therefore, the sequence of functions in the VPSC is defined independently from the encryption/decryption. In fact, the tenant can change the flow context at anytime while the packet is processed through the VPSC and the security association remains relevant regardless of the change to the sequence of functions. Thus, the tenant can ensure that any flow defined by its VPSC can remain secure and avoid data leakage within the service provider's network infrastructure.

Figure 8:
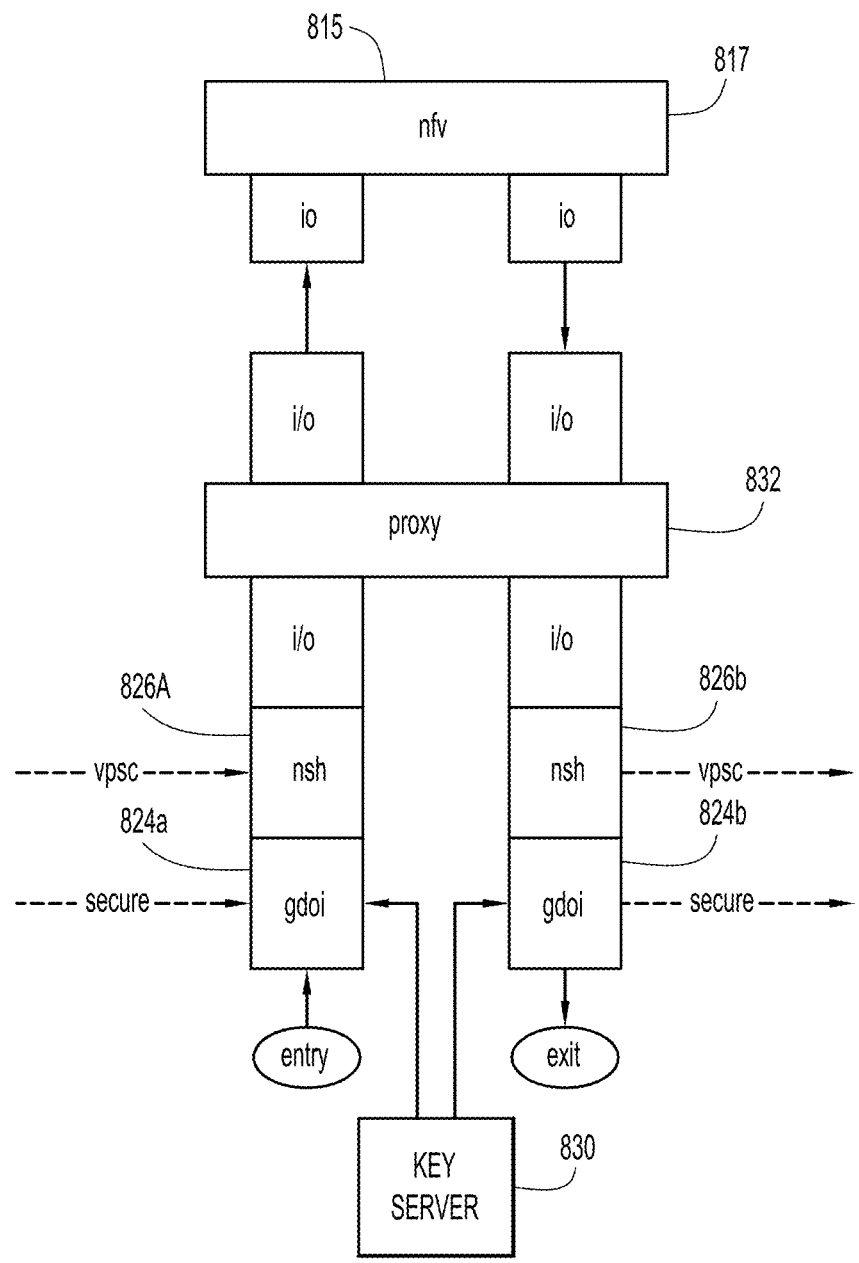
FIG. 8 is an illustration of a fourth virtual machine configured to utilize a proxy device to implement end-to-end security in a virtual private service chain, according to an example embodiment.

With reference now made to FIG. 8, depicted therein is another example VPSC in which network service 817 does not understand the service chaining methodology. To accommodate this lack of understanding, the network service 817 has an adjacency to a proxy server 832. The proxy server 832 executes all the virtual private service chaining and encryption on-behalf of network service 817. The service function 817 and the proxy 832 simply need to have context defined such that proxy 832 can perform service chaining on behalf of network service 817 and ensure that the ingress and egress flows are properly treated. The network service 817 is instantiated on a virtual machine 815 where the appropriate templates are used to define the ingress and egress interfaces necessary for network service 817 to function.

VPSC traffic received at route proxy 832 is decrypted using shared keys received from key server 830 by GDOI 824a. NSH functional unit 826a examines the header of the received traffic for context. The unencrypted or clear text traffic is then sent from route proxy 832 to virtual machine 815, where network service 817 is applied to the traffic. The traffic is then sent back to route proxy 832 for forwarding on to another network service.

Through NSH functional unit 826b, proxy 832 facilitates the insertion of a network service header. The IP packet is routed and encrypted with the IPsec encryption by route proxy 832 using the shared key received from GDOI 824b, and the packet is forward to the next service function. As with the other examples described above, the common key is distributed through GDOI; therefore, the sequence of functions in the VPSC is defined independently from the encryption/decryption. In fact, the tenant can change the flow context at anytime while the packet is processed through the VPSC and the security association remains relevant regardless of the change in sequence. Thus, the tenant can ensure that any flow defined by its VPSC can remain secure and avoid data leakage within the service provider's network infrastructure.

Figure 9:
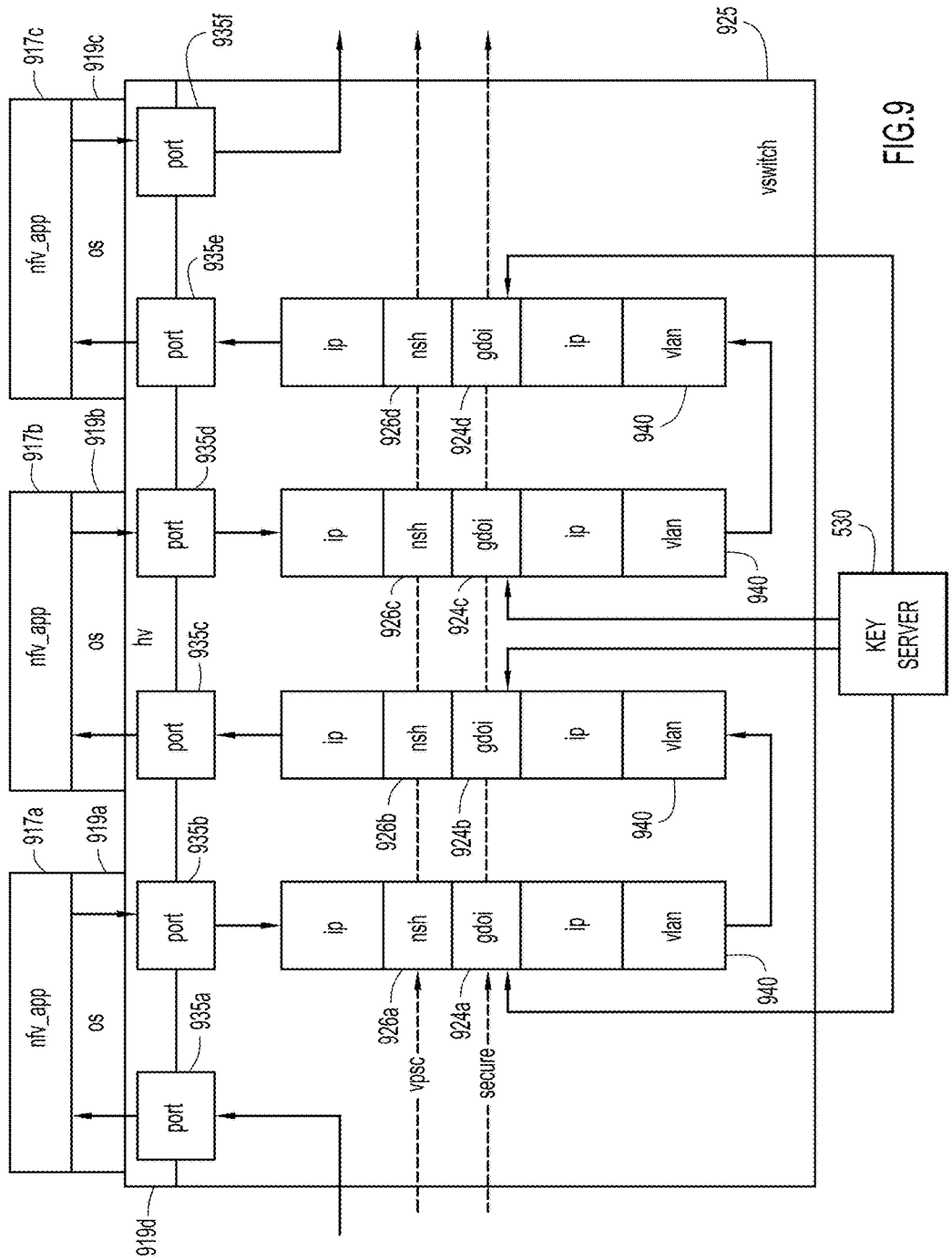
FIG. 9 is an illustration of a virtual switch configured to provide a plurality of network services and implement end-to-end security in a virtual private service chain, according to an example embodiment.

With reference now made to FIG. 9, depicted therein is a virtual switch 925 for a Virtual Local Area Network (VLAN) 940 in which multiple network functions 917a-c have been instantiated. Specifically, each of network functions 917a-c operates in a guest operating system 919a-c, respectively. Guest operating systems 919a-c execute within hypervisor 919d. Also included within virtual switch 925 are virtual ports 935a-f through which the network functions 917a-c receive and transmit clear text traffic. Upon exiting from a port, such as port 935b, virtual switch 925 will apply group security to the clear text traffic. Specifically, through NSH functional unit 926a, virtual switch 925 facilitates the insertion of a network service header. The IP packet is routed and encrypted with the IPsec encryption by virtual switch 925 using the shared key received from GDOI 924a, and the packet is forward to the next service function through VLAN 940.

Once received at the next network function 917b, virtual switch 925 facilitates the decryption of the packet using a group key received by GDOI 924b from key server 930. The network service header is examined for context by NSH functional unit 926b, and the network service 917b is applied to the unencrypted clear text packet. This process repeats itself for the application of network service 917c.

Figure 10:
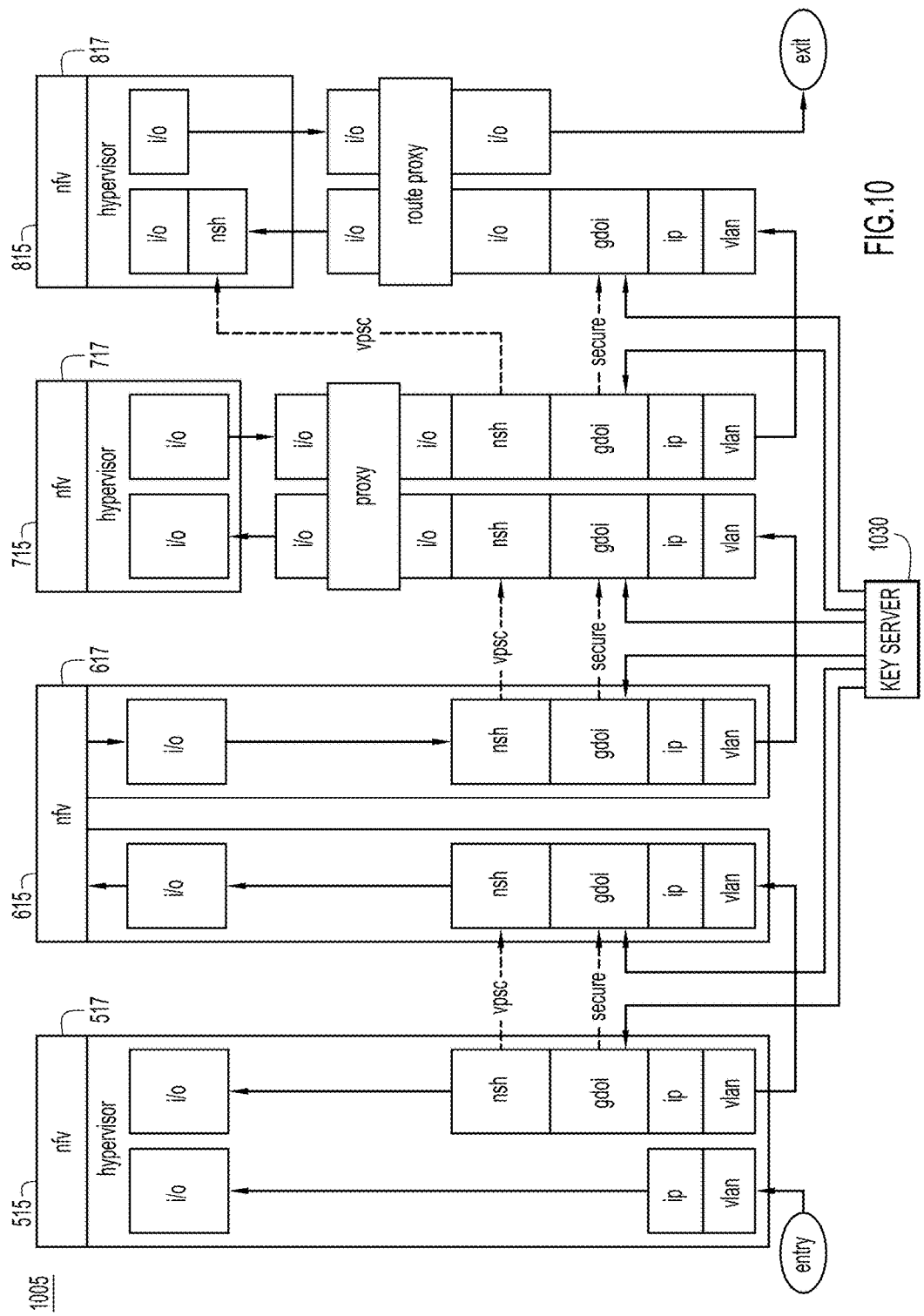
FIG. 10 is an illustration of a virtual private service chain utilizing a plurality of different types of virtual machines and configured to provide end-to-end security, according to an example embodiment.

With reference now made to FIG. 10, depicted therein is an example VPSC 1005 comprising virtual machine 515 from FIG. 5, virtual machine 615 from FIG. 6, virtual machine 715 from FIG. 7, and virtual machine 815 from FIG. 8. Accordingly, FIG. 10 serves to illustrate how the techniques of FIGS. 5-8 are interchangeable and may in fact be used in a hybrid mode VPSC. For example, the sequence of network services can be defined such that the different network services 515, 615, 715 and 815 all use different techniques to provide end-to-end privacy and security within VPSC 1005, so long as each of virtual machines 515, 615, 715 and 815 are assigned a common group key by, for example, key server 1030. Furthermore, a virtual switch, such as virtual switch 925 of FIG. 9 may also be included in VPSC 1005.

Because VPSC 1005 uses a common security association, the order of operations for the network services 515, 615, 715 and 815 can be modified on-the-fly by any of network services 515, 615, 715 and 815. In other words, regardless of the order of network services 515, 615, 715 and 815, the ingress-internal interface will be able to decrypt and evaluate the network service header.

Additionally, the distribution of flows through VPSC 1005 for load-balancing can be implemented dynamically because the group security association allows for network services 515, 615, 715 and 815 to appear as adjacent members in VPSC 1005, so long as an appropriate network service header is applied that defines the next instance of a network service in VPSC 1005. Accordingly, a load-balancing service function may be used upon entry which chooses any number of sequences for service functions 515, 615, 715 and 815, depending on, for example, current VPSC resources. The group security model makes any and all tenant service functions viable. Similarly, when a virtual switch that services numerous network functions, like virtual switch 925 of FIG. 9, is incorporated into a VPSC, packets may be sent to anyone of the network functions serviced by the switch from another virtual machine, or from within the virtual switch itself.

As described above, each individual tenant maintains its own security model and may ensure its VPSC is secured by assigning group keys using its own GCKS, such as key server 1030. A single group key may be used for all of a tenant's VPSCs, or a unique group key may be used for each VPSC. Because the tenant controls the security mechanism (e.g., GDOI), the tenant can ensure flows in its VPSC are secured regardless of where the service provider instantiates the service functions. For example, the service provider may use alternate data centers for redundancy and resiliency. If some of the tenant's service functions are executed in one data center and the remainder of the service functions are executed in an alternate data center, the internal VPSC flows are protected by the group key as they are routed between the data centers. The service provider may fail-over and restore the service infrastructure at anytime and this has no impact on the security associations assigned to the VPSC.

In other words, the techniques described herein enable a resource-friendly and simple mechanism to secure content throughout a VPSC, allowing a tenant to maintain end-to-end security while leveraging a third party service to provide the VPSC infrastructure. By implementing the techniques described herein, VPSC 1005 will be dynamic in nature, allowing functions to be added, re-ordered, removed, and distributed across the service provider infrastructure. Furthermore, VPSC 1005 can support multiple paths through network services 515, 615, 715 and 815 in order to optimize compute cycles of the underlying infrastructure.

The techniques as described herein also address the problem of allowing a tenant to provide security within a VPSC. A cloud provider may offer Platform as a Service (PaaS) to which a tenant may build its own platforms and load its own applications; however, the principal value of cloud computing is to enable flexible allocation of resources. This means that the cloud provider (i.e., service provider) is offering PaaS where the service provider may manage the operating systems and the tenant is able to establish one or more instances of an application within the PaaS environment. The security model associated with a specific application may be enforced by the tenant at the application level, but the security model associated with a flow that must traverse several distributed virtual network functions (e.g. firewall, load-balance, monitoring, service) associated with a service may be managed according to the techniques described herein.

Specifically, flows between the network service functions may be unable to authenticate within the application context in a service chain. It is only the last "go-to" function (the target application) that can authenticate a user (user id/password). On the other hand, the "go-through" context is established by a service chain which graphs together the various virtual network functions in route to the "go-to" application. The problem is the tenant may have no security control over the virtual network functions operating in the "go-through" context. While a point-to-point security association can be established between any adjacent virtual network function, doing so would create an unwieldy mesh. In addition, the security context is typically established within the platform operating system (e.g. IPsec) or infrastructure (e.g. MacSec); therefore, the tenant has no means of authenticating, authorizing, validating, or monitoring the state of the security adjacencies between the virtual network functions established in its service chains. By implementing the embodiments described herein, using for example group security, the "go through" flows can be secured by the tenant.

Figure 11:
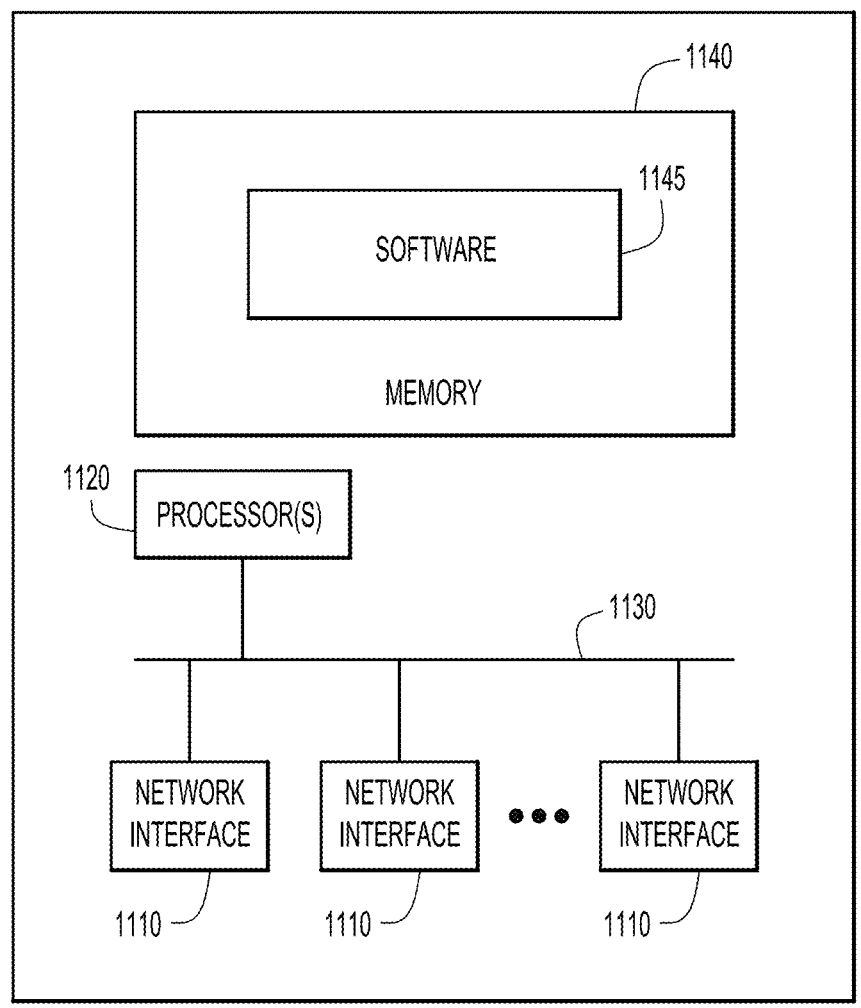
FIG. 11 is a block diagram of a device configured to provide end-to-end security in a virtual private service chain, according to an example embodiment.

Referring now to FIG. 11, an example block diagram is shown of a device 1100, configured to perform the techniques described herein. Device 1100 includes network interfaces 1110 which may be used to connect to network connected sensors and other network connected devices. A processor 1120 is provided to coordinate and control device 1100. The processor 1120 is, for example, one or more microprocessors or microcontrollers, and it communicates with the network interface 1110 via bus 1130. Memory 1140 stores or is encoded with software instructions 1145 which may be executed by the processor 1120. For example, software instructions 1145 for device 1100 may include software which instructs device 1100 to carry out the functions associated with network functions 517, 617, 717, 817 and 917*a-c* of FIGS. 4-9. Similarly, software instructions 1145 may instruct device 1100 to carry out the functions associated with virtual machines 515, 615, 715 and 815; VPPs 619*a* and 619*b* of FIG. 6-9; route proxy 732 of FIG. 7; proxy 832 of FIG. 8, and or virtual switch 925 of FIG. 9. In other words, memory 1140 includes instructions that allow device 1100 to carry out the operations described above in connection with FIGS. 1-10.

Memory 1140 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 1140 may include one or more tangible (non-transitory) computer readable storage media (e.g., a memory device) encoded with software comprising computer executable instructions. When the software, e.g., software 1145, is executed (by the processor 1120), the processor is operable to perform the operations described herein in connection with FIGS. 1-10.

In summary, in one form, a method is provided comprising: establishing a first virtual machine in a virtual private service chain to provide a first network service to virtual private service chain traffic. A second virtual machine is established in the virtual private service chain to provide a second network service to the virtual private service chain traffic. Traffic for transmission between the first virtual machine and the second virtual machine within the virtual private service chain is encrypted. A non-transitory computer readable storage media is also provided that stores or is encoded with instructions which, when executed by a processor, cause the processor to perform the operations of this method.

In another form, a method is provided comprising: retrieving an encryption key from a shared key server, wherein the retrieval of the encryption key is performed by a first virtual machine within a virtual private service chain. Traffic encrypted with the encryption key is received at the first virtual machine from a second virtual machine within the virtual private service chain. The traffic is decrypted using the encryption key, and network services are applied to the decrypted traffic. The decrypted traffic is re-encrypted using the encryption key and transmitted through the virtual private service chain. A non-transitory computer readable storage media is also provided that stores or is encoded with instructions which, when executed by a processor, cause the processor to perform the operations of this method.

In still another form, an apparatus is provided comprising: a network interface unit to enable communication over a network and a processor coupled to the network interface unit. The processor establishes a virtual machine within a virtual private service chain. The processor further retrieves via the first virtual machine an encryption key from a shared key server, and receives, from a second virtual machine within the virtual private service chain, traffic encrypted with the encryption key. The processor decrypts via the first virtual machine the traffic using the encryption key, and applies network services to the decrypted traffic via the first virtual machine. The processor then re-encrypts the decrypted traffic using the encryption key via the first virtual machine, and causes the traffic to be sent through the virtual private service chain.

The above description is intended by way of example only. Various modifications and structural changes may be made therein without departing from the scope of the concepts described herein and within the scope and range of equivalents of the claims.

What is claimed is:

1. A method comprising:
    establishing a first virtual machine in a virtual private service chain associated with a tenant to provide a first network service to virtual private service chain traffic, wherein the virtual private service chain is established within a service platform provided by a service provider hosting a plurality of virtual private service chains for a plurality of tenants;
    establishing a second virtual machine in the virtual private service chain to provide a second network service to the virtual private service chain traffic;
    receiving an encryption key from a key server arranged outside the service platform and maintained by the tenant;
    encrypting the virtual private service chain traffic at the first virtual machine for transmission within the virtual private service chain from the first virtual machine to the second virtual machine using the encryption key; and
    transmitting the traffic from the first virtual machine to the second virtual machine within the service platform.

2. The method of claim 1, wherein the traffic is decrypted at the second virtual machine for application of the second network service.

3. The method of claim 2, wherein the traffic is encrypted at a first virtual network interface card of the first virtual machine internal to the virtual private service chain, and the traffic is decrypted at a second virtual interface card of the second virtual machine internal to the virtual private service chain.

4. The method of claim 1, wherein the key server is a group controller key server.

5. The method of claim 1, wherein the encryption key is different from a key used to encrypt external traffic prior to the external traffic entering the virtual private service chain.

6. The method of claim 1, wherein the encryption is performed according to a Group Domain of Interpretation (GDOI) protocol.

7. The method of claim 1, further comprising:
    decrypting the virtual private service chain traffic at the second virtual machine; and
    applying the second network service to the virtual private service chain traffic.

8. The method of claim 1, wherein establishing the second virtual machine comprises establishing the second virtual machine on a same physical network node on which the first virtual machine is established.

9. The method of claim 1, wherein establishing the second virtual machine comprises establishing the second virtual machine on a same virtual switch on which the first virtual machine is established.

10. The method of claim 1, wherein establishing the second virtual machine comprises establishing the second virtual machine on a physical network node that is different from a physical network node on which the first virtual machine is established.

11. A method comprising:
    retrieving an encryption key from a shared key server, wherein the retrieval of the encryption key is performed by a first virtual machine within a virtual private service chain associated with a tenant and is established within a service platform provided by a service provider hosting a plurality of virtual private service chains for a plurality of tenants, and wherein the shared key server is arranged outside the service platform and maintained by the tenant;
    receiving, at the first virtual machine from a second virtual machine within the virtual private service chain, traffic encrypted with the encryption key;
    decrypting the traffic using the encryption key;
    applying network services to the decrypted traffic;
    re-encrypting the decrypted traffic using the encryption key; and
    transmitting the traffic through the virtual private service chain.

12. The method of claim 11, wherein the traffic is decrypted at an interface of the first virtual machine internal to the virtual private service chain.

13. The method of claim 11, wherein the key server provides the encryption key to the first virtual machine and second virtual machine.

14. The method of claim 11, wherein:
    the key server is a group controller key server.

15. The method of claim 11, wherein the encryption key is different from a key used to encrypt the virtual private service chain traffic prior to the virtual private service chain traffic entering the virtual private service chain.

16. The method of claim 11, wherein retrieving the encryption key comprises retrieving the encryption key according to a Group Domain of Interpretation (GDOI) protocol.

17. The method of claim 11, wherein the first virtual machine and the second virtual machine are established on a same physical network node.

18. An apparatus comprising:
    a network interface unit to enable communication over a network; and
    a processor coupled to the network interface unit, that:
        establishes a first virtual machine within a virtual private service chain associated with a tenant to provide a first network service to virtual private service chain traffic, wherein the virtual private service chain is established within a service platform provided by a service provider hosting a plurality of virtual private service chains for a plurality of tenants;
        retrieves via the first virtual machine an encryption key from a shared key server arranged outside the service platform and maintained by the tenant;
        receives, from a second virtual machine within the virtual private service chain, traffic encrypted with the encryption key;
        decrypts via the first virtual machine the traffic using the encryption key;
        applies network services to the decrypted traffic via the first virtual machine;
        re-encrypts the decrypted traffic using the encryption key via the first virtual machine; and
        causes the traffic to be sent through the virtual private service chain.

19. The apparatus of claim 18, wherein the processor decrypts the traffic at an interface of the first virtual machine internal to the virtual private service chain.

20. The apparatus of claim 18, wherein the key server provides the encryption key to the first virtual machine and second virtual machine.

21. The apparatus of claim 18, wherein the processor retrieves the encryption key from a group controller key server.

22. The apparatus of claim 18, wherein the processor retrieves the encryption key that is different from a key used to encrypt external traffic prior to the external traffic entering the virtual private service chain.

23. The apparatus of claim 18, wherein the processor retrieves the encryption key according to a Group Domain of Interpretation (GDOI) protocol.

24. The apparatus of claim 18, wherein the first virtual machine and the second virtual machine are established on a same physical network node.

* * * * *